United States Patent [19]

Yamada et al.

[11] 4,363,543

[45] Dec. 14, 1982

[54] CAMERA

[76] Inventors: Toyotaka Yamada, No. 352-19, Shimoda, Hino City, Tokyo; Fujio Enomoto, No. 159-1, Nagafuso Cho, Hachioji City, Tokyo, both of Japan

[21] Appl. No.: 8,131

[22] Filed: Jan. 31, 1979

[30] Foreign Application Priority Data

Feb. 2, 1978 [JP] Japan .................. 53-10879
Feb. 6, 1979 [JP] Japan .................. 54-13620[U]

[51] Int. Cl.³ .................. G03B 7/08; G03B 17/18
[52] U.S. Cl. .................. 354/58; 354/59; 354/127; 354/289
[58] Field of Search .................. 354/22, 23 R, 27, 28, 354/32–35, 37, 41, 42, 49, 58, 59, 60 F, 127, 128, 139, 145, 149, 289, 126

[56] References Cited

U.S. PATENT DOCUMENTS

| | | | |
|---|---|---|---|
| 3,886,568 | 5/1975 | Yazaki et al. | 354/27 |
| 3,906,526 | 9/1975 | Toyoshima et al. | 354/149 |
| 4,065,779 | 12/1977 | Lange | 354/149 X |
| 4,101,914 | 7/1978 | Yamashita et al. | 354/289 X |

FOREIGN PATENT DOCUMENTS 2333020  1/1975  Fed. Rep. of Germany ...... 354/149
502620  3/1939  United Kingdom .................. 354/42

*Primary Examiner*—William B. Perkey
*Attorney, Agent, or Firm*—Weingram & Klauber

[57] ABSTRACT

An automatic exposure camera and an autostrobo incorporated camera are disclosed. An automatic exposure camera comprises an ASA area plate rotatably supported on a camera lens housing and provided with a number of through-holes which successively vary an opening area, a light receiving element positioned opposite the through-holes and rotatably arranged at the back portion of the area plate, and an ASA ring being rotatably in accordance with an ASA sensitivity of a film and to position corresponding the light receiving element with the through-hole at a predetermined opening area, the area plate being made rotatable in accordance with a predetermined iris setting or a shutter setting as provided by the light receiving element. The camera comprises a diaphragm ring for setting an iris and selecting a flash mark by rotational operation, a diaphragm blade which open angle is set in accordance with a rotating angle of the diaphragm ring, a light receiving portion for setting a light incident amount to a light receiving element in accordance with the angle of rotation the diaphragm ring, and a switch lever selectively interlocked with the flash mark of the diaphragm ring for switching a strobe power source switch to ON.

5 Claims, 4 Drawing Figures

CAMERA

BACKGROUND OF THE INVENTION

The present invention relates to a camera, more particularly to an automatic exposure camera which can automatically control a shutter time in accordance with an object.

In an aperture preferential type automatic exposure camera, a film sensitivity and an aperture information are previously set on the side of a camera and the thus set exposure is given to an automatic exposure circuit as a variable of the shutter time.

As a setting means of the film sensitivity (ASA) and the aperture value in such kind of automatic exposure cameras, there has been such construction shown in FIG. 1. That is, reference numeral 1 is a diaphragm ring rotatably supported on a camera lens housing, and this diaphragm ring 1 is provided with an ASA setting ring 2. On a plate surface of the ASA setting ring 2 are formed a number of through-holes 2a which successively vary an opening area, and on a plate surface of the diaphragm ring 1 corresponding to the through-hole 2a is formed an elongate hole 1a, and light from an object is transmitted to the side of a light receiving element 3 fixed through the through-hole 2a and the elongate hole 1a. Further, in this case, the diaphragm ring 1 and the ASA setting ring 2 are frictionally coupled or click-coupled, so that when the diaphragm ring 1 is rotated along a scale 4 marked on the lens housing, the ASA setting ring 2 is integrally rotated to press the diaphragm ring 1, and as a result, if the ASA setting ring 2 is rotated, it is rotated along an ASA scale 5 marked on the diaphragm ring 1 regardless of the diaphragm ring 1.

In the automatic exposure camera having such construction, the diaphragm ring 1 is firstly pressed, the ASA setting ring 2 is only rotated, and after setting the film sensitivity, the diaphragm ring 1 is set on a desired scale, thereby adjusting light from an object transmitted to the light receiving element 3 through the through-hole 2a and controlling the shutter time.

According to this construction, however, the diaphragm ring and the ASA setting ring are click-coupled or frictionally coupled, so that operation for setting the film sensitivity becomes troublesome and mechanically complicated. Further, the diaphragm ring and the ASA setting ring are independently and relatively rotated against the fixed light receiving element, so that a lengthwise size of the elongate hole on the diaphragm ring and a rotating angle of the ASA setting ring require the maximum rotating angle of the diaphragm ring + the maximum rotating angle of the ASA setting ring, and it is difficult to adjust both the rings when assembling.

The present invention also relates to a camera provided with an autostrobe for making flash photography possible.

Hitherto, this kind of cameras combined with an autostrobe requires the following various operations.

(1) The ASA sensitivity of a film should be set.
(2) An iris on the side of a camera should be set to an F value matched with efficiency of the autostrobo.
(3) An electric power source on the side of the strobo is set to ON.

Therefore, for flash photography with such a camera, it takes time and is troublesome, and if one of the above operations is ignored, precious photographs are spoiled.

SUMMARY OF THE INVENTION

An object of the present invention is to eliminate the above disadvantages.

Another object of the present invention is to provide an automatic exposure camera, wherein the operation for setting a film sensitivity is easy, the construction is simple and the adjustment when assembling is plain.

Another object of the present invention is to provide a camera which can set an iris matched with an F value of the autostrobe and switching of the strobe side source switch to ON at the same time, simplify the operation at the time of flash photography, and automatically correct exposure, too.

According to the present invention an automatic exposure camera comprises an ASA area plate rotatably supported on a camera lens housing and provided with a number of through-holes which successively vary an opening area, a light receiving element positioned opposite the through-holes and rotatably arranged at the back portion of the area plate, and an ASA ring being rotatable in accordance with an ASA sensitivity of a film and corresponding the light receiving element to the through-hole at a predetermined opening area, the area plate being made rotatable in accordance with an iris setting or a shutter setting as provided by the light receiving element. The camera comprises a diaphragm ring for setting an iris and selecting a flash mark by rotational operation, a diaphragm blade whose open angle is set in accordance with an angle of rotation of the diaphragm ring, a light receiving portion for setting a light incident amount to a light receiving element in accordance with the angle of rotation of the diaphragm ring, and a switch lever selectively interlocked with the flash mark of the diaphragm ring for switching a strobe side source switch to ON. The camera also comprises a circuit interlocked with the switch lever for varying a shutter time by a predetermined interval.

DESCRIPTION OF THE PREFERRED EMBODIMENT

Figure 1:
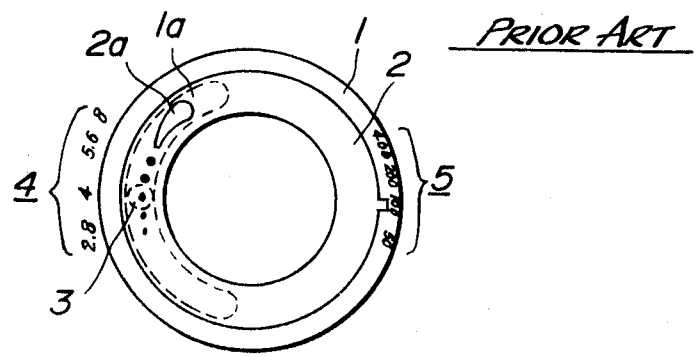
FIG. 1 is a schematic illustration showing one embodiment of a conventional automatic exposure camera.
Figure 2:
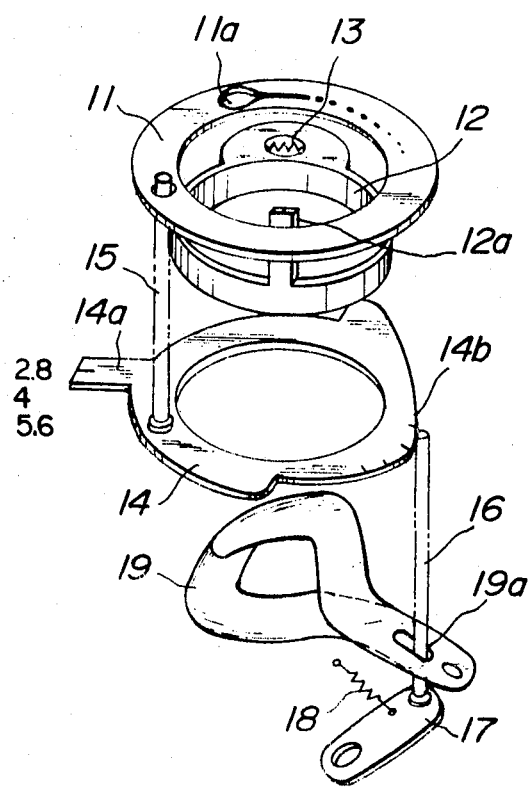
FIG. 2 is an exploded perspective view showing one embodiment of an automatic exposure camera according to the present invention.

Referring now to the drawings FIG. 2 shows one embodiment of an automatic exposure camera according to the present invention. Reference numeral 11 is an ASA area plate rotatably supported on the end portion of a camera lens housing, and on a plate surface of the area plate 11 are formed a number of through-holes 11a which successively vary an opening are.

On a back portion of the ASA area plate 11 is rotatably arranged an ASA ring 12. This ASA ring 12 is provided with a light receiving element 13 positioned opposite the through-hole 11a of the area plate 11. The light receiving element 13 is for receiving light from an object incident through the through-hole 11a.

The ASA ring 12 is provided with an ASA setting knob 12a. The knob 12a is set on an ASA scale in accordance with the ASA sensitivity of a film, the ASA ring 12 is correspondingly rotated so as to correspond the light receiving element 13 to the through-hole 11a of a predetermined opening area.

On a back portion of the ASA ring 12 is arranged a diaphragm ring 14. The diaphragm ring 14 is rotatably held by the camera lens housing. Further, on the diaphragm ring 14 are formed a lever 14a and an aperture switching cam portion 14b.

The above lever 14a is for setting an exposure value, and the diaphragm ring 14 is rotated by setting the lever 14a on the scale attached to an immovable member of the camera lens housing. In this case, the lever 14a is fixed to 2.8 at the time of the maximum opening, but the aperture can successively be changed in the minimum opening direction by rotating the lever 14a in the counter-clockwise direction as illustrated in FIG. 2.

To the diaphragm ring 14 is coupled the ASA area plate 11 through a coupling lever 15 for rotating the area plate 11 in accordance with an angle of rotation, i.e., an iris, of the diaphragm ring 14 and for determining the through-hole 1a corresponding to the light receiving element 13.

An aperture operating lever 16 is provided by contacting with the cam portion 14b of the diaphragm ring 14. The lever 16 is secured to a lever 17 at one end, rotated and displaced by a spring 18 in the direction made to contact with the cam portion 14b, and moved along the cam 14b by rotation in accordance with the aperture of the diaphragm ring 14. The lever 16 is further inserted into an opening and closing operation hole portion 19a of a diaphragm blade 19 for setting the opening of the blade 9 by movement in accordance with the rotation of the diaphragm right 14.

The action of the camera constructed as described will be explained. At first, the ASA set knob 12a is set on the ASA scale in accordance with the film sensitivity, the ASA ring 12 is rotated accordingly and the light receiving element 13 corresponds to the through-hole 11a of a predetermined opening area.

Under such condition, if the lever 14a of the diaphragm ring 14 is set on an optional scale, the diaphragm ring 14 is rotated by its scale, the lever 16 brought into contact with the cam portion 14b by this rotation is moved along the cam portion 14b, and as a result, the blade 19 is set at the opening in accordance with the above value. At the same time, the ASA area plate 11 is rotated through the coupling lever 15 in accordance with the rotation of the diaphragm ring 14, and the through-hole 11a in accordance with the above value is met with the light receiving element 13.

Therefore, if a shutter button is pressed under this condition, light from an object is given to the light receiving element 13 through the through-hole 11a, the shutter time is determined, the shutter is driven and EE photographing can be carried out.

According to this construction, against the ASA ring 12 area plate interlocked with the diaphragm ring, ASA having the light receiving element can independently be rotated, and the rotation of this ASA ring makes the setting of the film sensitivity possible, so that as compared with the conventional system made by click coupling or frictionally coupling the diaphragm ring with the ASA setting ring, the operation for setting the film sensitivity is considerably simplified, and the construction is mechanically simple. The light receiving element itself is rotated together with the ASA ring, so that the range of rotation of the diaphragm ring and the ASA area plate corresponding thereto can be made the minimum, and as a result the adjustment when assembling becomes easy.

Figure 3:
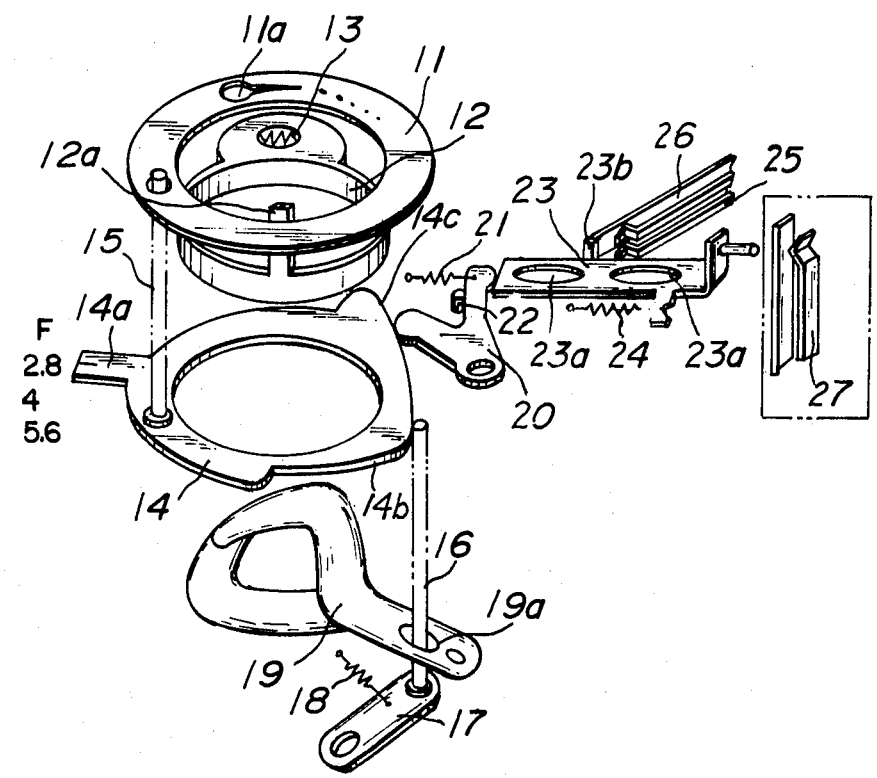
FIG. 3 is an exploded perspective view showing another embodiment of the camera according to the invention.

Another embodiment of the present invention will be explained with reference to FIGS. 3 and 4. FIG. 3 shows another embodiment for applying the present invention to a diaphragm preferential electronic shutter camera. In FIG. 3, reference numeral 11 is an ASA area plate rotatably supported at the end portion of a camera lens housing, and on the plate surface of this area plate 11 are formed a plurality of through-holes 11a for successively varying an opening area.

At the back portion of the ASA area plate 11 is arranged an ASA ring 12. The ASA ring 12 is provided with a light receiving element 13 at the position opposite a plurality of through-holes 11a of the area plate 11. The light receiving element 13 is for receiving light from an object to be photographed through the through-hole 11a.

The ASA ring 12 is provided with an ASA set knob 12a. The knob 12a is set at a scale (not shown) in accordance with the ASA sensitivity of a film so as to rotate the ASA ring 12 and to correspond the light receiving element 13 to the through-hole 11a of a predetermined opening area.

On the back portion of the ASA ring 12 is arranged a diaphragm ring 14. This diaphragm ring 14 is rotatably supported by a camera lens housing. This diaphragm ring 14 is also provided with a lever 14a, a cam portion 14b for switching a diaphragm blade and a projection portion 14c.

The lever 14a is for setting an iris, and when the lever 14a is set at the scale attached to an unmovable member of the camera lens housing, the diaphragm ring 14 is rotated by a predetermined angle. In this case, the lever 14a agrees to 2.8 at the time of the maximum opening as illustrated, but the lever 14a is rotated in the counter-clockwise direction and the diaphragm is successively throttled in the mainimum opening direction or rotated in the clockwise direction and when it matches with the flash mark F, the diaphragm matched with the F value of the autostrobe can be set.

Further, to the diaphragm ring 14 is coupled the ASA area plate 11 through a coupling lever 15 for rotating the area plate 11 in accordance with the angle of rotation of the diaphragm ring 14, i.e., an iris, and determining the through-hole 11a corresponding to the light receiving element 13.

The diaphragm operating lever 16 is provided by contacting with a cam portion 14b of the diaphragm ring 14. The operating lever 16 is secured to a diaphragm lever 17 at one end, rotatably deviated in the direction for contacting with said cam portion 14b and moved along a cam portion 14a by rotation in accordance with the diaphragm ring 14. Further, the lever 16 is inserted into a switch operating hole portion 19a of the diaphragm blade 19 for setting an opening angle of the diaphragm blade 19 by movement in accordance with the diaphragm ring 14.

A switch lever 20 is arranged in correspondence with the projection portion 14c of the diaphragm ring 14. The lever 20 is constantly rotated and deviated in the counter-clockwise direction until it is made into contact with a stopper 22 by means of a spring 21, and when the lever 14a of the diaphragm ring 14 is set at the flash mark F, the lever 20 is pressed by the projection portion 14c and rotated in the clockwise direction.

The other switch lever 23 is arranged in correspondence with the lever 20. The lever 23 is linearly movable in the longitudinal direction along the length of an elongated hole 23a formed in lever 23. Lever 23 is urged in the left direction as illustrated until it is made to contact with the lever 20 by means of spring 24 and moved in the left direction as illustrated when the lever 20 move in that direction.

A projection 23b, provided on lever 23, closes contacts 25, 26 by the movement of the lever 23 in the right direction as illustrated. In this case, the contact 25 is for limiting the shutter time, for instance, if an object to be photographed is dark and a sufficient amount of light cannot be obtained even if a strobe is used and the shutter left open, the contact 25 forcibly sets the shutter at the original position. The contact 26 is for correcting exposure when flash photographing.

A power source switch 27 on the side of the strobe is provided at the end of the lever 23 correspondingly for turning the switch 27 ON by movement of the lever 23 in the right direction as illustrated.

The action of the camera constructed as described above will be explained. If the lever 14a of the diaphragm ring 14 is set at an optional scale, the diaphragm ring 14 is rotated by its amount so as to rotate the ASA area plate 11 through the coupling lever 15 and to match the through-hole 11a in accordance with said value with the light receiving element 13. The lever 16 contacting the cam portion 14b by movement of the diaphragm ring 14 is moved along the cam portion 14b, thereby setting the diaphragm blade 19 at the opening angle in accordance with said value.

Figure 4:
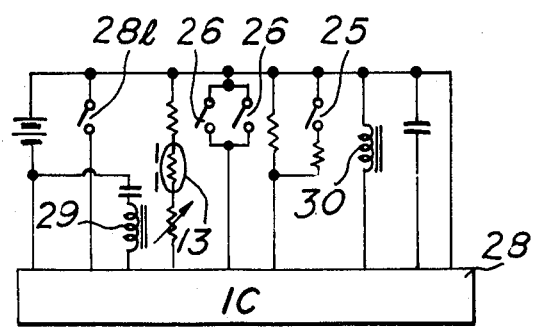
FIG. 4 is a circuit diagram of an electronic shutter used in the same embodiment.

In the above state, the electron shutter circuit shown in FIG. 4 is actuated by interlocking with the shutter button. In this case, the electronic shutter circuit is composed of an IC circuit 28 as a main circuit and its input output circuit is only illustrated. In FIG. 4, if a switch 281 is turned ON by interlocking with the shutter button, a pulse current flows into an electromagnet 29 and it is made OFF (or ON). Then, the shutter blade starts its opening action, incident light from an object to be photographed is received by the light receiving element 13, and by its output an integrated circuit starts counting. Thereafter, when an integrated value of the integrated circuit reaches a predetermined level, an electromagnet 30 is turned OFF and the shutter blade is closed, thereby completing EE photographing.

In order to carry out strobe photography, if the lever 14a of the diaphragm ring 14 is set at the flash mark F, the diaphragm blade 19 is set at the opening angle in accordance with the value by rotation of the diaphragm ring 14 in the same manner as described above. Further, the switch lever 20 is simultaneously pressed by the projection portion 14c and rotated in the clockwise direction. Accordingly, the lever 23 is linearly moved in the right direction as illustrated, switch 27 is turned ON, and the contacts 25, 26 are closed.

When the diaphragm ring 14 is set at the flash mark F, at the same time with the setting of the opening angle of the diaphragm blade 19, the ASA area plate 11 is rotated as described above, but in this case, the plate 11 is rotated in the direction for making the area of the hole 11a larger. Therefore, the light receiving element 13 meets with the through-hole 11a corresponding to the iris 2.8 at the time of the maximum opening. Therefore, supposing that the F value of the strobe is about 3.5, it is necessary to correct the exposure by abberation of the opening area of the through-hole 11a for the purpose of meeting with the F value. In this invention, the setting of the integrated circuit of the electronic shutter circuit shown in FIG. 4 is changed by closing the contact 26 and the shutter time is delayed by a predetermined time.

Accordingly, in this state, if the electronic shutter circuit shown in FIG. 4 is actuated, the shutter circuit is actuated in the same manner as described above and flash photographing can be performed.

Even if the strobe is flashed, if the object to be photographed is dark and a sufficient reflection light amount cannot be obtained and the shutter is left open, by closing the contact 25 the output is forcibly generated from the integrated circuit of the electronic shutter circuit shown in FIG. 4 after a predetermined time, thereby restoring the shutter.

According to such construction, the setting of an iris suitable for the F value of the strobe and turning the switch on the strobe side ON can simultaneously be carried-out by operating the lever of the diaphragm ring, so that the operation at the time of flash photographing is further simplified and as a result, the risk that a part of the operation is ignored and the resulting photographing is spoiled can positively be removed.

The exposure correction in case of the flash photographing is simultaneously and automatically carried out together with the operation of the lever, so that the flash photography is always maintained at the better condition.

In addition, the present invention is not limited to the above described embodiment but can be properly modified without departing from the range of the essential features.

As described above, this invention can simultaneously set the iris matched with the F value of the autostrobe and the strobe side power source switch, simplify the switching operation in case of flash photographing, and automatically correct the exposure in case of flash photographing.

In addition, the above embodiment relates to the aperture preferential type, but the present invention can be applied to a shutter preferential type. In this case, a shutter ring is provided instead of the diaphragm ring 14.

As described above, the present invention provides an automatic exposure camera, wherein the operation for setting the film sensitivity is simple, the construction is simple and the adjustment when assembling is also easy.

What is claimed is:

1. An automatic exposure camera comprising:
    an ASA plate rotatably supported on a camera lens housing and provided with a series of through holes which successively vary an opening area;
    a control element for setting an iris or shutter coupled with said ASA plate to rotate with said ASA plate;
    an ASA ring mounted on said camera lens housing, rotatable over a predetermined range in accordance with an ASA sensitivity of a film;
    said ASA ring rotation and position being independent of the rotation and position of said ASA plate and independent of rotation and position of said control element for setting the iris or shutter; and
    a light receiving element fixed to said ASA ring and positioned behind said through holes and in registration to said through holes to vary the light reaching said light receiving element in relation to said position of said ASA ring.

2. The automatic camera according to claim 1 wherein:
said control element for setting the iris or shutter is disposed behind said light receiving element; and
rod means connect said ASA plate to said control element.

3. A camera comprising:
a diaphram ring rotatable for setting an iris and selecting a flash setting by rotation of said ring;
a plurality of diaphram blades positioned in accordance with the rotational angle of the diaphram ring including an open position;
an ASA plate rotatably supported on a camera lens housing and provided with a series of through holes which successively vary an opening area;
an ASA ring mounted on a camera lens, rotatable over a predetermined range in accordance with an ASA sensitivity of a film;
said ASA ring rotation and position of said ASA plate and independent of the rotation and position of said diaphram ring for setting the iris;
a light receiving element positioned behind said through holes and in registration to said through holes to vary the light reaching said light receiving element in relation to said position of said ASA ring;
a switch lever selectively interlocked with a flash setting of the diaphram ring for switching a strobe source switch to the on position.

4. The automatic camera according to claim 3 wherein:
said diaphram ring for setting the iris is disposed behind said light receiving element;
rod means connect said ASA plate to said diaphram ring.

5. A camera as claimed in claim 4 further comprising a circuit interlocked with the switch lever for varying the shutter by a predetermined time.

* * * * *

UNITED STATES PATENT OFFICE
CERTIFICATE OF CORRECTION

Patent No. 4,363,543     Dated Dec. 14, 1982

Inventor(s) Yamada et al.

It is certified that error appears in the above-identified patent and that said Letters Patent are hereby corrected as shown below:

On the title page:

Foreign Application Priority Data:

Correct second application

"Feb. 6, 1979 [JP] Japan..........54-13620[U]" to

--Feb. 6, 1978 [JP] Japan..........53-13620[U]--.

Signed and Sealed this

Twenty-second Day of March 1983

[SEAL]

Attest:

GERALD J. MOSSINGHOFF

Attesting Officer     Commissioner of Patents and Trademarks